(12) United States Patent
O'Keeffe et al.

(10) Patent No.: US 9,604,279 B2
(45) Date of Patent: Mar. 28, 2017

(54) MATERIAL CONTAINING VESSELS FOR MELTING MATERIAL

(75) Inventors: Sean Timothy O'Keeffe, Tustin, CA (US); Quoc Tran Pham, Anaheim, CA (US); Theodore Andrew Waniuk, Lake Forest, CA (US); Michael Blaine Deming, Trabuco Canyon, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/391,731

(22) PCT Filed: Apr. 13, 2012

(86) PCT No.: PCT/US2012/033564
§ 371 (c)(1),
(2), (4) Date: Jan. 14, 2015

(87) PCT Pub. No.: WO2013/154581
PCT Pub. Date: Oct. 17, 2013

(65) Prior Publication Data
US 2015/0158080 A1    Jun. 11, 2015

(51) Int. Cl.
*B22D 17/20* (2006.01)
*B22D 17/04* (2006.01)
(Continued)

(52) U.S. Cl.
CPC ......... *B22D 17/2038* (2013.01); *B22D 17/04* (2013.01); *B22D 17/203* (2013.01);
(Continued)

(58) Field of Classification Search
CPC .... B22D 17/04; B22D 17/10; B22D 17/2023; B22D 17/203; B22D 17/2038; B29C 45/1734; B29C 45/1735
(Continued)

(56) References Cited

U.S. PATENT DOCUMENTS 2,960,326 A * 11/1960 Lourens ............... C30B 13/14
                                                    117/900
4,842,038 A *  6/1989 Fujino .................. B22D 17/28
                                                    164/113
(Continued)

FOREIGN PATENT DOCUMENTS

| EP | 1134049 | 9/2001 |
| JP | 2004050269 | 2/2004 |
| JP | 2010036210 | 2/2010 |

OTHER PUBLICATIONS

International Search Report and Written Opinion, PCT/ISA/210, PCT/ISA/220, PCT/ISA/237, mail date Jan. 10, 2013.

*Primary Examiner* — Kevin E Yoon
(74) *Attorney, Agent, or Firm* — Brownstein Hyatt Farber Schreck, LLP

(57) ABSTRACT

Disclosed is a vessel for melting meltable material having a body with a melting portion configured to receive meltable material to be melted therein and an injection path for injecting the meltable material in molten form after melting (e.g., into a mold). The body has a recess configured to contain the meltable material within the vessel during melting of the material. The vessel is configured for movement between in a first position to restrict entry of molten material into an injection path of the vessel and to contain the material in the recess during melting, and a second position to allow movement of the material in a molten form through the injection path and into the mold (e.g., using a plunger). The vessel can be used in an injection molding system for molding bulk amorphous alloys.

21 Claims, 9 Drawing Sheets

(51) Int. Cl.
*B22D 25/06* (2006.01)
*B29C 45/00* (2006.01)
*C22C 45/00* (2006.01)
*C22C 45/02* (2006.01)
*C22C 45/10* (2006.01)
*B29L 31/00* (2006.01)

(52) U.S. Cl.
CPC ......... *B22D 17/2023* (2013.01); *B22D 25/06* (2013.01); *B29C 45/0001* (2013.01); *C22C 45/001* (2013.01); *C22C 45/003* (2013.01); *C22C 45/02* (2013.01); *C22C 45/10* (2013.01); *B29L 2031/772* (2013.01)

(58) Field of Classification Search
USPC .......................................... 164/113, 303–318
See application file for complete search history.

(56) References Cited

U.S. PATENT DOCUMENTS

| | | | | |
|---|---|---|---|---|
| 6,089,846 A | * | 7/2000 | Collot | B22D 17/007 164/312 |
| 6,230,786 B1 | * | 5/2001 | Choshi | B22D 17/30 164/312 |
| 2003/0056930 A1 | * | 3/2003 | Plata | B22D 17/007 164/80 |
| 2007/0187061 A1 | * | 8/2007 | Siddle | B22D 17/2023 164/312 |

* cited by examiner

CROSS SECTION OF FIG. 4 THROUGH RECESS

LONGITUDINAL CROSS SECTION OF FIG. 4 (ON X-AXIS)

LONGITUDINAL CROSS SECTION OF FIG. 7 (ON X-AXIS)

CROSS SECTION OF FIG. 7 THROUGH RECESS

END VIEW OF CROSS SECTION 10-10 OF FIG. 10

CROSS SECTION OF FIG. 10 THROUGH RECESS

MATERIAL CONTAINING VESSELS FOR MELTING MATERIAL

CROSS REFERENCE TO RELATED APPLICATION(S)

This application is the U.S. National Phase of PCT/US2012/033564, filed Apr. 13, 2012, the entire contents of which are hereby incorporated by reference in its entirety.

FIELD

The present disclosure is generally related to boats or vessels used for melting materials, including materials to be injected into a mold.

BACKGROUND

When melting materials in an injection molding system, uniform melting and temperature of the meltable material should be implemented and maintained in order to produce quality molded parts. Some injection molding machines use an induction coil to melt material before injecting the material into a mold. However, magnetic fluxes from the induction coil tend to cause molten materials to move unpredictably, which can make it difficult to control the uniformity and temperature of the molten material. Additionally, the molten material has to be retained in the melt zone so that it does not mix too much or cool too quickly. Utilizing effective vessels during melting can improve quality of parts formed from molten material.

SUMMARY

A proposed solution according to embodiments herein for improving molded objects or parts is to use bulk-solidifying amorphous alloys.

One aspect of the disclosure provides a vessel for melting meltable material having a body with a melting portion configured to receive meltable material to be melted therein and an injection path for injecting the meltable material in molten form after melting, the body having a recess configured to contain the meltable material within the vessel during melting of the material.

Another aspect of the disclosure provides an injection molding system including: a melt zone configured to melt meltable material received therein, and a vessel in the melt zone, the vessel having a body for receiving the meltable material having a recess configured to contain the meltable material within the vessel during melting of the material.

Yet another aspect of the disclosure provides a method of melting a material in a meltable form including:
providing an apparatus having a vessel, the vessel being configured to move between a first position and a second position and having a recess configured to contain the meltable material within the vessel during melting of the material;
providing a material to be melted within the vessel;
providing the vessel in the first position to restrict entry of molten material into an injection path of the vessel and to contain the material in the recess during melting;
applying a vacuum to the apparatus;
melting the material in the vessel, and
providing the vessel in the second position to allow movement of the material in a molten form through the injection path and into the mold.

Still yet another aspect of the disclosure provides a method of making a bulk amorphous alloy part including:
providing an apparatus having a vessel and a mold, the vessel being configured to move between a first position and a second position and having a recess configured to contain the meltable material within the vessel during melting of the material;
providing an alloy material to be melted within the vessel;
providing the vessel in the first position to restrict entry of molten alloy material into an injection path of the vessel and to contain the material in the recess during melting;
applying a vacuum to the apparatus;
melting the alloy material in the vessel;
providing the vessel in the second position to allow movement of the molten alloy material through the injection path and into the mold, and
molding the molten material using the mold into the bulk amorphous alloy part Other features and advantages of the present disclosure will become apparent from the following detailed description, the accompanying drawings, and the appended claims.

DETAILED DESCRIPTION

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. Amorphous alloys have many superior properties than their crystalline counterparts. However, if the cooling rate is not sufficiently high, crystals may form inside the alloy during cooling, so that the benefits of the amorphous state can be lost. For example, one challenge with the fabrication of bulk amorphous alloy parts is partial crystallization of the parts due to either slow cooling or impurities in the raw alloy material. As a high degree of amorphicity (and, conversely, a low degree of crystallinity) is desirable in BMG parts, there is a need to develop methods for casting BMG parts having controlled amount of amorphicity.

Figure 1:
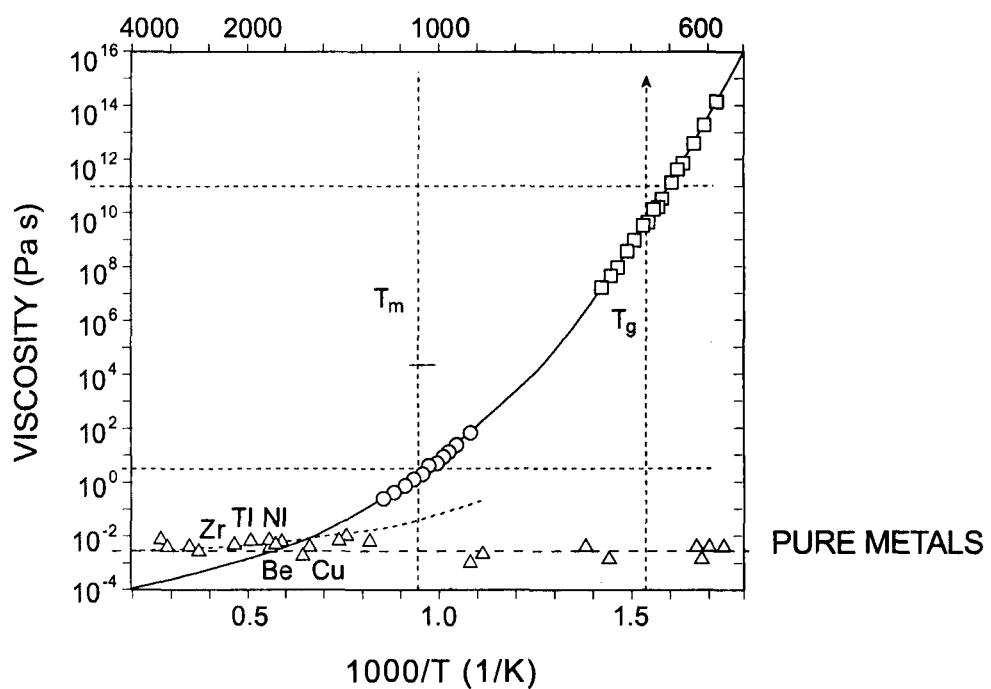
FIG. 1 provides a temperature-viscosity diagram of an exemplary bulk solidifying amorphous alloy.

FIG. 1 (obtained from U.S. Pat. No. 7,575,040) shows a viscosity-temperature graph of an exemplary bulk solidifying amorphous alloy, from the VIT-001 series of Zr—Ti—Ni—Cu—Be family manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 2:
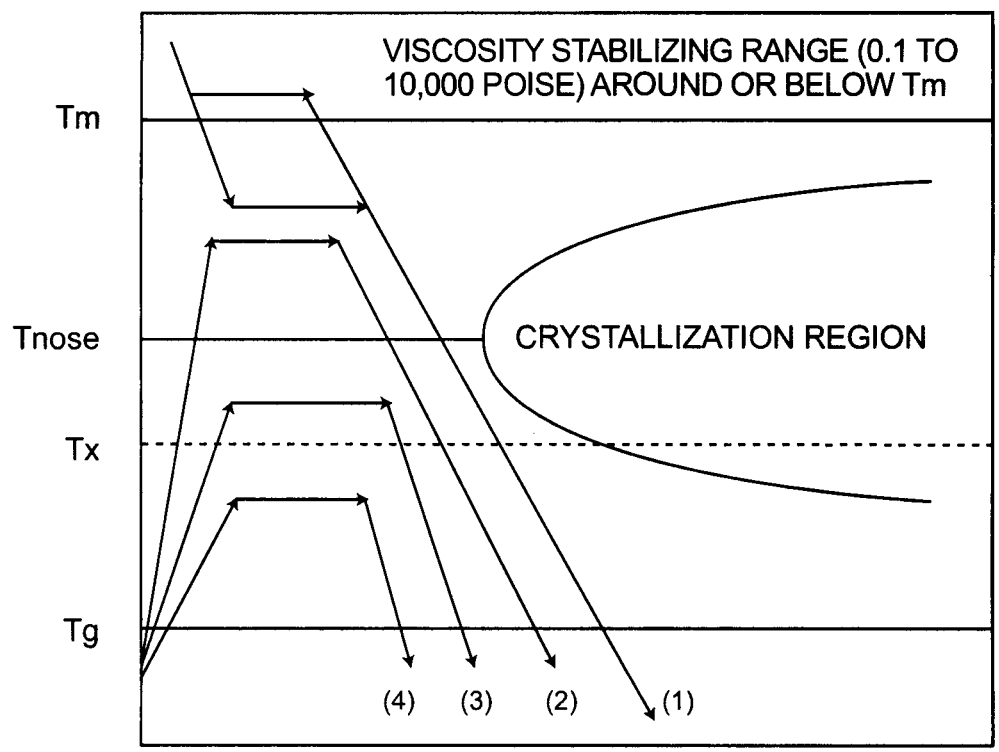
FIG. 2 provides a schematic of a time-temperature-transformation (TTT) diagram for an exemplary bulk solidifying amorphous alloy.

FIG. 2 (obtained from U.S. Pat. No. 7,575,040) shows the time-temperature-transformation (TTT) cooling curve of an exemplary bulk solidifying amorphous alloy, or TTT diagram. Bulk-solidifying amorphous metals do not experience a liquid/solid crystallization transformation upon cooling, as with conventional metals. Instead, the highly fluid, non crystalline form of the metal found at high temperatures (near a "melting temperature" Tm) becomes more viscous as the temperature is reduced (near to the glass transition temperature Tg), eventually taking on the outward physical properties of a conventional solid.

Even though there is no liquid/crystallization transformation for a bulk solidifying amorphous metal, a "melting temperature" Tm may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. A lower viscosity at the "melting temperature" would provide faster and complete filling of intricate portions of the shell/mold with a bulk solidifying amorphous metal for forming the BMG parts. Furthermore, the cooling rate of the molten metal to form a BMG part has to such that the time-temperature profile during cooling does not traverse through the nose-shaped region bounding the crystallized region in the TTT diagram of FIG. 2. In FIG. 2, Tnose is the critical crystallization temperature Tx where crystallization is most rapid and occurs in the shortest time scale.

The supercooled liquid region, the temperature region between Tg and Tx is a manifestation of the extraordinary stability against crystallization of bulk solidification alloys. In this temperature region the bulk solidifying alloy can exist as a high viscous liquid. The viscosity of the bulk solidifying alloy in the supercooled liquid region can vary between $10^{12}$ Pa s at the glass transition temperature down to $10^5$ Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

One needs to clarify something about Tx. Technically, the nose-shaped curve shown in the TTT diagram describes Tx as a function of temperature and time. Thus, regardless of the trajectory that one takes while heating or cooling a metal alloy, when one hits the TTT curve, one has reached Tx. In FIG. 1 (b), Tx is shown as a dashed line as Tx can vary from close to Tm to close to Tg.

The schematic TTT diagram of FIG. 2 shows processing methods of die casting from at or above Tm to below Tg without the time-temperature trajectory (shown as (1) as an example trajectory) hitting the TTT curve. During die casting, the forming takes place substantially simultaneously with fast cooling to avoid the trajectory hitting the TTT curve. The processing methods for superplastic forming (SPF) from at or below Tg to below Tm without the time-temperature trajectory (shown as (2), (3) and (4) as example trajectories) hitting the TTT curve. In SPF, the amorphous BMG is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above Tnose or below Tnose, up to about Tm. If one heats up a piece of amorphous alloy but manages to avoid hitting the TTT curve, you have heated "between Tg and Tm", but one would have not reached Tx.

Typical differential scanning calorimeter (DSC) heating curves of bulk-solidifying amorphous alloys taken at a heating rate of 20 C/min describe, for the most part, a particular trajectory across the TTT data where one would likely see a Tg at a certain temperature, a Tx when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 2, then one could avoid the TTT curve entirely, and the DSC data would show a glass transition but no Tx upon heating. Another way to think about it is trajectories (2), (3) and (4) can fall anywhere in temperature between the nose of the TTT curve (and even above it) and the Tg line, as long as it does not hit the crystallization curve. That just means that the horizontal plateau in trajectories might get much shorter as one increases the processing temperature.

Phase

The term "phase" herein can refer to one that can be found in a thermodynamic phase diagram. A phase is a region of space (e.g., a thermodynamic system) throughout which all physical properties of a material are essentially uniform. Examples of physical properties include density, index of refraction, chemical composition and lattice periodicity. A simple description of a phase is a region of material that is chemically uniform, physically distinct, and/or mechanically separable. For example, in a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

Metal, Transition Metal, and Non-Metal

The term "metal" refers to an electropositive chemical element. The term "element" in this Specification refers generally to an element that can be found in a Periodic Table. Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal" refers to a chemical element that does not have the capacity to lose electrons and form a positive ion.

Depending on the application, any suitable nonmetal elements, or their combinations, can be used. The alloy (or "alloy composition") can comprise multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, O, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, unununilium, unununium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can comprise multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used.

The alloy sample or specimen can also be of a much larger dimension. For example, it can be a bulk structural component, such as an ingot, housing/casing of an electronic device or even a portion of a structural component that has dimensions in the millimeter, centimeter, or meter range.

Solid Solution

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

Alloy

In some embodiments, the alloy composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

Amorphous or Non-Crystalline Solid

An "amorphous" or "non-crystalline solid" is a solid that lacks lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The terms "order" and "disorder" designate the presence or absence of some symmetry or correlation in a many-particle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true, except, for example, in quasi-crystals that have perfectly deterministic tilings but do not possess lattice periodicity.

Long-range order characterizes physical systems in which remote portions of the same sample exhibit correlated behavior. This can be expressed as a correlation function, namely the spin-spin correlation function:

$$G(x,x')=\langle s(x), s'(x')\rangle.$$

In the above function, s is the spin quantum number and x is the distance function within the particular system. This function is equal to unity when x=x' and decreases as the distance |x−x'| increases. Typically, it decays exponentially to zero at large distances, and the system is considered to be disordered. If, however, the correlation function decays to a constant value at large |x−x'|, then the system can be said to possess long-range order. If it decays to zero as a power of the distance, then it can be called quasi-long-range order. Note that what constitutes a large value of |x−x'| is relative.

A system can be said to present quenched disorder when some parameters defining its behavior are random variables that do not evolve with time (i.e., they are quenched or frozen)—e.g., spin glasses. It is opposite to annealed disorder, where the random variables are allowed to evolve themselves. Embodiments herein include systems comprising quenched disorder.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or "crystallinity" for short in some embodiments) of an alloy can refer to the amount of the crystalline phase present in the alloy. The degree can refer to, for example, a fraction of crystals present in the alloy. The fraction can refer to volume fraction or weight fraction, depending on the context. A measure of how "amorphous" an amorphous alloy is can be amorphicity. Amorphicity can be measured in terms of a degree of crystallinity. For example, in one embodiment, an alloy having a low degree of crystallinity can be said to have a high degree of amorphicity. In one embodiment, for example, an alloy having 60 vol % crystalline phase can have a 40 vol % amorphous phase.

Amorphous Alloy or Amorphous Metal

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared.

Amorphous metals can be produced through a variety of quick-cooling methods. For instance, amorphous metals can be produced by sputtering molten metal onto a spinning metal disk. The rapid cooling, on the order of millions of degrees a second, can be too fast for crystals to form, and the material is thus "locked in" a glassy state. Also, amorphous metals/alloys can be produced with critical cooling rates low enough to allow formation of amorphous structures in thick layers—e.g., bulk metallic glasses.

The terms "bulk metallic glass" ("BMG"), bulk amorphous alloy ("BAA"), and bulk solidifying amorphous alloy are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metals can be an alloy rather than a pure metal. The alloys may contain atoms of significantly different sizes, leading to low free volume (and therefore having viscosity up to orders of magnitude higher than other metals and alloys) in a molten state. The viscosity prevents the atoms from moving enough to form an ordered lattice. The material structure may result in low shrinkage during cooling and resistance to plastic deformation. The absence of grain boundaries, the weak spots of crystalline materials in some cases, may, for example, lead to better resistance to wear and corrosion. In one embodiment, amorphous metals, while technically glasses, may also be much tougher and less brittle than oxide glasses and ceramics.

Thermal conductivity of amorphous materials may be lower than that of their crystalline counterparts. To achieve formation of an amorphous structure even during slower cooling, the alloy may be made of three or more components, leading to complex crystal units with higher potential energy and lower probability of formation. The formation of amorphous alloy can depend on several factors: the composition of the components of the alloy; the atomic radius of the components (preferably with a significant difference of over 12% to achieve high packing density and low free volume); and the negative heat of mixing the combination of components, inhibiting crystal nucleation and prolonging the time the molten metal stays in a supercooled state. However, as the formation of an amorphous alloy is based on many different variables, it can be difficult to make a prior determination of whether an alloy composition would form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which can have none of the defects (such as dislocations) that limit the strength of crystalline alloys. For example, one modern amorphous metal, known as Vitreloy™, has a tensile strength that is almost twice that of high-grade titanium. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used. Alternatively, a BMG low in element(s) that tend to cause embitterment (e.g., Ni) can be used. For example, a Ni-free BMG can be used to improve the ductility of the BMG.

Another useful property of bulk amorphous alloys is that they can be true glasses; in other words, they can soften and flow upon heating. This can allow for easy processing, such as by injection molding, in much the same way as polymers. As a result, amorphous alloys can be used for making sports equipment, medical devices, electronic components and equipment, and thin films. Thin films of amorphous metals can be deposited as protective coatings via a high velocity oxygen fuel technique.

A material can have an amorphous phase, a crystalline phase, or both. The amorphous and crystalline phases can have the same chemical composition and differ only in the microstructure—i.e., one amorphous and the other crystalline. Microstructure in one embodiment refers to the structure of a material as revealed by a microscope at 25× magnification or higher. Alternatively, the two phases can have different chemical compositions and microstructures. For example, a composition can be partially amorphous, substantially amorphous, or completely amorphous.

As described above, the degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. A substance that is uniform in composition is homogeneous. This is in contrast to a substance that is heterogeneous. The term "composition" refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically comprises a substantially uniformly distributed amorphous alloy throughout the composition. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or a different chemical composition. In one embodiment, they have substantially the same chemical composition. In another embodiment, the crystalline phase can be more ductile than the BMG phase.

The methods described herein can be applicable to any type of amorphous alloy. Similarly, the amorphous alloy described herein as a constituent of a composition or article can be of any type. The amorphous alloy can comprise the element Zr, Hf, Ti, Cu, Ni, Pt, Pd, Fe, Mg, Au, La, Ag, Al, Mo, Nb, Be, or combinations thereof. Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt %, such as at least about 40 wt %, such as at least about 50 wt %, such as at least about 60 wt %, such as at least about 80 wt %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

For example, the amorphous alloy can have the formula $(Zr, Ti)_a(Ni, Cu, Fe)_b(Be, Al, Si, B)_c$, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula $(Zr, Ti)_a(Ni, Cu)_b(Be)_c$, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula $(Zr, Ti)_a(Ni, Cu)_b(Be)_c$, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula $(Zr)_a(Nb, Ti)_b(Ni, Cu)_c(Al)_d$, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One exemplary embodiment of the aforedescribed alloy system is a Zr—Ti—Ni—Cu—Be based amorphous alloy under the trade name Vitreloy™ such as Vitreloy-1 and Vitreloy-101, as fabricated by Liquidmetal Technologies, CA, USA. Some examples of amorphous alloys of the different systems are provided in Table 1 and Table 2.

TABLE 1

Additional Exemplary amorphous alloy compositions (atomic %)

| Alloy | Atm % | Atm % | Atm % | Atm % | Atm % | Atm % |
|---|---|---|---|---|---|---|
| 1 | Zr 41.20% | Ti 13.80% | Cu 12.50% | Ni 10.00% | Be 22.50% | |
| 2 | Zr 44.00% | Ti 11.00% | Cu 10.00% | Ni 10.00% | Be 25.00% | |
| 3 | Zr 56.25% | Ti 11.25% | Cu 6.88% | Ni 5.63% | Nb 7.50% | Be 12.50% |
| 4 | Zr 64.75% | Ti 5.60% | Cu 14.90% | Ni 11.15% | Al 2.60% | Be 1.00% |
| 5 | Zr 52.50% | Ti 5.00% | Cu 17.90% | Ni 14.60% | Al 10.00% | |
| 6 | Zr 57.00% | Nb 5.00% | Cu 15.40% | Ni 12.60% | Al 10.00% | |
| 7 | Zr 50.75% | Cu 36.23% | Ni 4.03% | Al 9.00% | | |

TABLE 1-continued

Additional Exemplary amorphous alloy compositions (atomic %)

| Alloy | Atm % | Atm % | Atm % | Atm % | Atm % | Atm % |
|---|---|---|---|---|---|---|
| 8 | Zr 46.75% | Ti 8.25% | Cu 7.50% | Ni 10.00% | Be 27.50% | |
| 9 | Zr 21.67% | Ti 43.33% | Ni 7.50% | Be 27.50% | | |
| 10 | Zr 35.00% | Ti 30.00% | Cu 7.50% | Be 27.50% | | |
| 11 | Zr 35.00% | Ti 30.00% | Co 6.00% | Be 29.00% | | |
| 12 | Zr 35.00% | Ti 30.00% | Fe 2.00% | Be 33.00% | | |
| 13 | Au 49.00% | Ag 5.50% | Pd 2.30% | Cu 26.90% | Si 16.30% | |
| 14 | Au 50.90% | Ag 3.00% | Pd 2.30% | Cu 27.80% | Si 16.00% | |
| 15 | Pt 57.50% | Cu 14.70% | Ni 5.30% | P 22.50% | | |
| 16 | Zr 36.60% | Ti 31.40% | Nb 7.00% | Cu 5.90% | Be 19.10% | |
| 17 | Zr 38.30% | Ti 32.90% | Nb 7.30% | Cu 6.20% | Be 15.30% | |
| 18 | Zr 39.60% | Ti 33.90% | Nb 7.60% | Cu 6.40% | Be 12.50% | |
| 19 | Cu 47.00% | Ti 34.00% | Zr 11.00% | Ni 8.00% | | |
| 20 | Zr 55.00% | Co 25.00% | Al 20.00% | | | |

TABLE 2

Exemplary amorphous alloy compositions

| Alloy | Atm % | Atm % | Atm % | Atm % | Atm % | Atm % | Atm % |
|---|---|---|---|---|---|---|---|
| 1 | Fe 68.00% | Mo 5.00% | Ni 5.00% | Cr 2.00% | P 12.50% | C 5.00% | B 2.50% |
| 2 | Fe 68.00% | Mo 5.00% | Ni 5.00% | Cr 2.00% | P 11.00% | C 5.00% | B 2.50% | Si 1.50% |
| 3 | Pd 44.48% | Cu 32.35% | Co 4.05% | P 19.11% | | | |
| 4 | Pd 77.50% | Ag 6.00% | Si 9.00% | P 7.50% | | | |
| 5 | Pd 79.00% | Ag 3.50% | Si 9.50% | P 6.00% | Ge 2.00% | | |
| 6 | Pt 74.70% | Cu 1.50% | Ag 0.30% | P 18.0% | B 4.00% | Si 1.50% | |

Other exemplary ferrous metal-based alloys include compositions such as those disclosed in U.S. Patent Application Publication Nos. 2007/0079907 and 2008/0118387. These compositions include the Fe(Mn, Co, Ni, Cu) (C, Si, B, P, Al) system, wherein the Fe content is from 60 to 75 atomic percentage, the total of (Mn, Co, Ni, Cu) is in the range of from 5 to 25 atomic percentage, and the total of (C, Si, B, P, Al) is in the range of from 8 to 20 atomic percentage, as well as the exemplary composition Fe48Cr15Mo14Y2C15B6. They also include the alloy systems described by Fe—Cr—Mo—(Y,Ln)—C—B, Co—Cr—Mo-Ln-C—B, Fe—Mn—Cr—Mo—(Y,Ln)—C—B, (Fe, Cr, Co)—(Mo,Mn)—(C,B)—Y, Fe—(Co,Ni)—(Zr,Nb,Ta)—(Mo,W)—B, Fe—(Al,Ga)—(P,C,B,Si,Ge), Fe—(Co, Cr,Mo,Ga,Sb)—P—B—C, (Fe, Co)—B—Si—Nb alloys, and Fe—(Cr—Mo)—(C,B)—Tm, where Ln denotes a lanthanide element and Tm denotes a transition metal element. Furthermore, the amorphous alloy can also be one of the exemplary compositions $Fe_{80}P_{12.5}C_5B_{2.5}$, $Fe_{80}P_{11}C_5B_{2.5}Si_{1.5}$, $Fe_{74.5}Mo_{5.5}P_{12.5}C_5B_{2.5}$, $Fe_{74.5}Mo_{5.5}P_{11}C_5B_{2.5}Si_{1.5}$, $Fe_{70}Mo_5Ni_5P_{12.5}C_5B_{2.5}$, $Fe_{70}Mo_5Ni_5P_{11}C_5B_{2.5}Si_{1.5}$, $Fe_{68}Mo_5Ni_5Cr_2P_{12.5}C_5B_{2.5}$, and $Fe_{68}Mo_5Ni_5Cr_2P_{11}C_5B_{2.5}Si_{1.5}$, described in U.S. Patent Application Publication No. 2010/0300148.

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., Mater. Trans., JIM, Volume 42, p 2136 (2001), and Japanese Patent Application No. 200126277 (Pub. No. 2001303218 A). One exemplary composition is $Fe_{72}Al_5Ga_2P_{11}C_6B_4$. Another example is $Fe_{72}Al_7Zr_{10}Mo_5W_2B_{15}$. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

The amorphous alloy can also be one of the Pt- or Pd-based alloys described by U.S. Patent Application Publication Nos. 2008/0135136, 2009/0162629, and 2010/0230012. Exemplary compositions include $Pd44.48Cu32.35Co4.05P19.11$, $Pd77.5Ag6Si9P7.5$, and $Pt74.7Cu1.5Ag0.3P18B4Si1.5$.

The aforedescribed amorphous alloy systems can further include additional elements, such as additional transition metal elements, including Nb, Cr, V, and Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

In some embodiments, a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the alloy sample/composition consists essentially of the amorphous alloy (with only a small incidental amount of impurities). In another embodiment, the composition includes the amorphous alloy (with no observable trace of impurities).

In one embodiment, the final parts exceeded the critical casting thickness of the bulk solidifying amorphous alloys.

In embodiments herein, the existence of a supercooled liquid region in which the bulk-solidifying amorphous alloy can exist as a high viscous liquid allows for superplastic forming. Large plastic deformations can be obtained. The ability to undergo large plastic deformation in the supercooled liquid region is used for the forming and/or cutting process. As oppose to solids, the liquid bulk solidifying alloy deforms locally which drastically lowers the required energy for cutting and forming. The ease of cutting and forming depends on the temperature of the alloy, the mold, and the cutting tool. As higher is the temperature, the lower is the viscosity, and consequently easier is the cutting and forming.

Embodiments herein can utilize a thermoplastic-forming process with amorphous alloys carried out between Tg and Tx, for example. Herein, Tx and Tg are determined from standard DSC measurements at typical heating rates (e.g. 20° C./min) as the onset of crystallization temperature and the onset of glass transition temperature.

The amorphous alloy components can have the critical casting thickness and the final part can have thickness that is thicker than the critical casting thickness. Moreover, the time and temperature of the heating and shaping operation is selected such that the elastic strain limit of the amorphous alloy could be substantially preserved to be not less than 1.0%, and preferably not being less than 1.5%. In the context of the embodiments herein, temperatures around glass transition means the forming temperatures can be below glass transition, at or around glass transition, and above glass transition temperature, but preferably at temperatures below the crystallization temperature $T_x$. The cooling step is carried out at rates similar to the heating rates at the heating step, and preferably at rates greater than the heating rates at the heating step. The cooling step is also achieved preferably while the forming and shaping loads are still maintained.

Electronic Devices

The embodiments herein can be valuable in the fabrication of electronic devices using a BMG. An electronic device herein can refer to any electronic device known in the art. For example, it can be a telephone, such as a cell phone, and a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including a portable DVD player, conventional DVD player, Blu-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock.

The methods, techniques, and devices illustrated herein are not intended to be limited to the illustrated embodiments.

As disclosed herein, an apparatus or a system (or a device or a machine) is configured to perform melting of and injection molding of material(s) (such as amorphous alloys). The apparatus is configured to process such materials or alloys by melting at higher melting temperatures before injecting the molten material into a mold for molding. As further described below, parts of the apparatus are positioned in-line with each other. In accordance with some embodiments, parts of the apparatus (or access thereto) are aligned on a horizontal axis.

The following embodiments are for illustrative purposes only and are not meant to be limiting.

Figure 3:
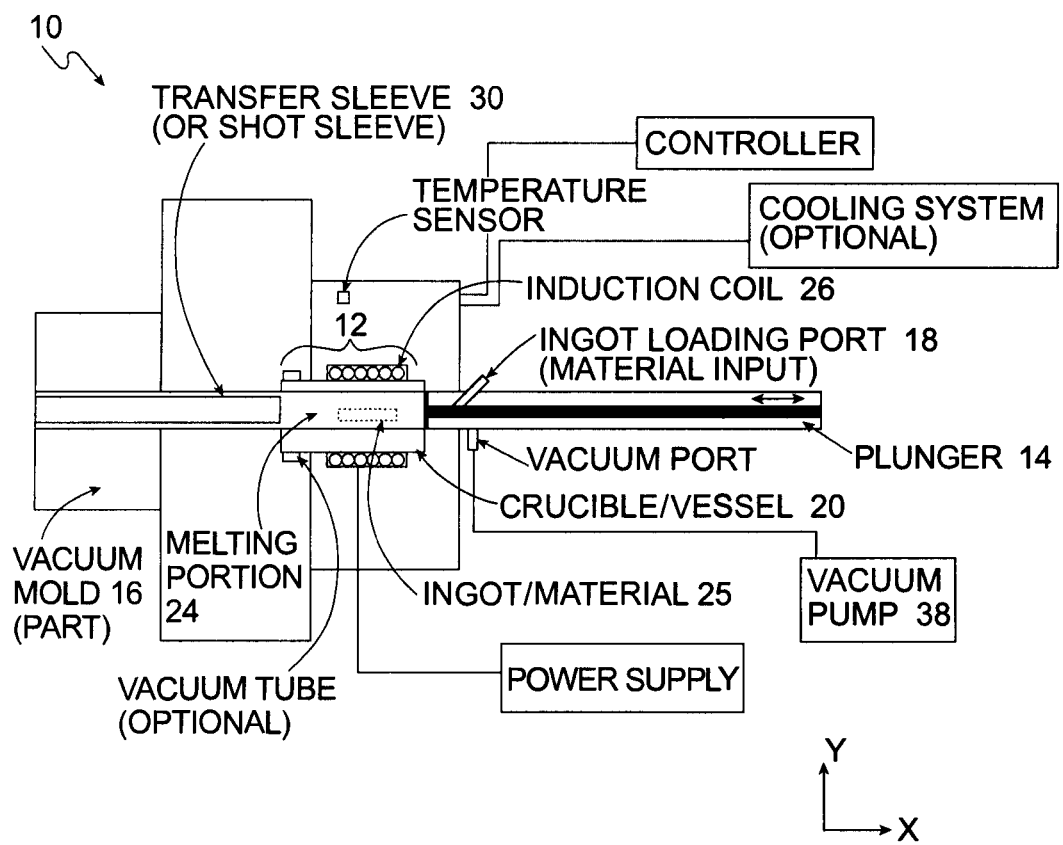
FIG. 3 illustrates a schematic diagram of an exemplary system for using a vessel such as disclosed herein.

FIG. 3 illustrates a schematic diagram of such an exemplary system. More specifically, FIG. 3 illustrates an injection molding apparatus or system 10. In accordance with an embodiment, injection molding system 10 has a melt zone 12 configured to melt meltable material received therein, and at least one plunger rod 14 configured to eject molten material from melt zone 12 and into a mold 16. In an embodiment, at least plunger rod 14 and melt zone 12 are provided in-line and on a horizontal axis (e.g., X axis), such that plunger rod 14 is moved in a horizontal direction (e.g., along the X-axis) substantially through melt zone 12 to move the molten material into mold 16. The mold can be positioned adjacent to the melt zone.

The material to be melted, or "meltable material", can be received in the melt zone in any number of forms. For example, the meltable material may be provided into melt zone 12 in the form of an ingot (solid state), a semi-solid state, a slurry that is preheated, powder, pellets, etc. For explanatory purposes only, throughout this disclosure meltable material is described and illustrated as being in the form of an ingot 25 that is in the form of a solid state feedstock; however, it should be noted that the material to be melted may be received in the injection molding system or apparatus 10 in a solid state, a semi-solid state, a slurry that is preheated, powder, pellets, etc., and that the form of the material is not limiting. In some embodiments, a loading port (such as the illustrated example of an ingot loading port 18) may be provided as part of injection molding system 10. Loading port 18 can be a separate opening or area that is provided within the machine at any number of places. In an embodiment, loading port 18 may be a pathway through one or more parts of the machine. For example, the material (e.g., ingot) may be inserted in a horizontal direction into vessel 20 by plunger 14, or may be inserted in a horizontal direction from the mold side of the injection system 10 (e.g., through mold 16 and/or through a transfer sleeve 30 into vessel 20). In other embodiments, the meltable material can be provided into melt zone 12 in other manners and/or using other devices (e.g., through an opposite end of the injection system).

Melt zone 12 includes a melting mechanism configured to receive meltable material and to hold the material as it is heated to a molten state. The melting mechanism may be in the form of a vessel 20, for example, that has a body for receiving meltable material and configured to melt the material therein. A vessel as used throughout this disclosure is a container or device made of a material employed for heating substances to high temperatures. It is provided in a melt zone 12 and used to hold material as it is melted. For example, in an embodiment, the vessel may be a crucible, such as a boat style crucible. In an embodiment, vessel 20 is a cold hearth melting device that is configured to be utilized for meltable material(s) while under a vacuum (e.g., applied by a vacuum device 38 or pump). Vessel 20 may also have an inlet for inputting material (e.g., feedstock) into a receiving or melting portion 24 of its body. In some embodiments, the body of vessel 20 comprises a substantially U-shaped structure. However, this illustrated shape is not meant to be limiting. Vessel 20 can comprise any number of shapes or configurations. The body of the vessel has a length and can extend in a longitudinal and horizontal direction, such that molten material is removed horizontally therefrom using plunger 14. The material for heating or melting may be received in a melting portion 24 of the vessel. Melting portion 24 is configured to receive meltable material to be melted therein. For example, melting portion 24 has a surface for receiving material. Vessel 20 may receive material (e.g., in the form of an ingot) in its melting portion 24 using one or more devices of an injection system for delivery (e.g., loading port and plunger). Further description regarding embodiments of vessels for employment in system 10 is provided below with reference to FIGS. 4-12.

The body of vessel 20 may be configured to receive the plunger rod therethrough in a horizontal direction to move the molten material. That is, in an embodiment, the melting mechanism is on the same axis as the plunger rod, and the body can be configured and/or sized to receive at least part of the plunger rod. Thus, plunger rod 14 can be configured to move molten material (after heating/melting) from the vessel by moving substantially through vessel 20, and into mold 16. Referencing the illustrated embodiment of system 10 in FIG. 3, for example, plunger rod 14 would move in a horizontal direction from the right towards the left, through vessel 20, moving and pushing the molten material towards and into mold 16.

To heat melt zone 12 and melt the meltable material received in vessel 20, injection system 10 also includes a heat source that is used to heat and melt the meltable material At least melting portion 24 of the vessel, if not substantially the entire body itself, is configured to be heated such that the material received therein is melted. Heating is accomplished using, for example, an induction source 26 positioned within melt zone 12 that is configured to melt the meltable material. In an embodiment, induction source 26 is positioned adjacent vessel 20. For example, induction source 26 may be in the form of a coil positioned in a helical pattern substantially around a length of the vessel body. Accordingly, vessel 20 may be configured to hold meltable material (e.g., an inserted ingot) as it is inductively melted within melting portion 24 by supplying power to induction source/coil 26, using a power supply or source. Thus, the melt zone 12 can include an induction zone. Induction coil 26 is configured to heat up and melt any material that is contained by vessel 20 without melting and wetting vessel 20. Induction coil 26 emits radiofrequency (RF) waves towards melting portion 24 (and towards vessel 20). The body of vessel 20 and coil 26 may be configured to be positioned longitudinally in a horizontal direction along a horizontal axis (e.g., X axis).

In one embodiment, the vessel 20 is a temperature regulated vessel. Such a vessel may include one or more temperature regulating lines configured to flow a liquid (e.g., water, or other fluid) therein for regulating a temperature of the body of vessel 20 during melting of material received in the vessel (e.g., to force cool the vessel). Such a forced-cool crucible can also be provided on the same axis as the plunger rod. The cooling line(s) can assist in preventing excessive heating and melting of the body of the vessel 20 itself. Cooling line(s) may be connected to a cooling system configured to induce flow of a liquid in the vessel. The cooling line(s) may include one or more inlets and outlets for the liquid or fluid to flow therethrough. The inlets and outlets of the cooling lines may be configured in any number of ways and are not meant to be limited. For example, cooling line(s) may be positioned relative to melting portion 24 such that material thereon is melted and the vessel temperature is regulated (i.e., heat is absorbed, and the vessel is cooled). The number, positioning and/or direction of the cooling line(s) should not be limited. Although not shown, it should be understood that the below described embodiments of vessels in FIGS. 4-12 may further include cooling line(s) within the body of the vessel. The cooling liquid or fluid may be configured to flow through the cooling line(s) during melting of the meltable material, when induction source 26 is powered.

After the material is melted in the vessel 20, plunger 14 may be used to force the molten material from the vessel 20 and into a mold 16 for molding into an object, a part or a piece. In instances wherein the meltable material is an alloy, such as an amorphous alloy, the mold 16 is configured to form a molded bulk amorphous alloy object, part, or piece. Mold 16 has an inlet for receiving molten material therethrough. An output of the vessel 20, referred as its injection path herein throughout, and an inlet of the mold 16 can be provided in-line and on a horizontal axis such that plunger rod 14 is moved in a horizontal direction through body of the vessel to eject molten material from the vessel, through its injection path and then inject it into the mold 16 via its inlet. As will be understood throughout, the "injection path" of a vessel in any of the herein disclosed embodiments is the path in the body which material in its molten state (i.e., after melting) is pushed through and ejected from for injection into a mold.

As previously noted, systems such as injection molding system 10 that are used to mold materials such as metals or alloys may implement a vacuum when forcing molten material into a mold or die cavity. Injection molding system 10 can further includes at least one vacuum source 38 or pump that is configured to apply vacuum pressure to at least melt zone 12 and mold 16. The vacuum pressure may be applied to at least the parts of the injection molding system 10 used to melt, move or transfer, and mold the material therein. For example, the vessel 20, transfer sleeve 30, and plunger rod 14 may all be under vacuum pressure and/or enclosed in a vacuum chamber.

In an embodiment, mold 16 is a vacuum mold that is an enclosed structure configured to regulate vacuum pressure therein when molding materials. For example, in an embodiment, vacuum mold 16 comprises a first plate (also referred to as an "A" mold or "A" plate), a second plate (also referred to as a "B" mold or "B" plate) positioned adjacently (respectively) with respect to each other. The first plate and second plate generally each have a mold cavity associated therewith for molding melted material therebetween. The cavities are configured to mold molten material received therebetween via an injection sleeve or transfer sleeve 30. The mold cavities may include a part cavity for forming and molding a part therein.

Generally, the first plate may be connected to transfer sleeve 30. In accordance with an embodiment, plunger rod 14 is configured to move molten material from vessel 20, through a transfer sleeve 30, and into mold 16. Transfer sleeve 30 (sometimes referred to as a shot sleeve, a cold sleeve or an injection sleeve in the art and herein) may be provided between melt zone 12 and mold 16. Transfer sleeve 30 has an opening that is configured to receive and allow transfer of the molten material therethrough and into mold 16 (using plunger 14). Its opening may be provided in a horizontal direction along the horizontal axis (e.g., X axis). The transfer sleeve need not be a cold chamber. In an embodiment, at least plunger rod 14, vessel 20 (e.g., its receiving or melting portion), and opening of the transfer sleeve 30 are provided in-line and on a horizontal axis, such that plunger rod 14 can be moved in a horizontal direction through vessel 20 in order to move the molten material into (and subsequently through) the opening of transfer sleeve 30.

Molten material is pushed in a horizontal direction through transfer sleeve 30 and into the mold cavity(ies) via the inlet (e.g., in a first plate) and between the first and second plates. During molding of the material, the at least first and second plates are configured to substantially eliminate exposure of the material (e.g., amorphous alloy) therebetween to at least oxygen and nitrogen. Specifically, a vacuum is applied such that atmospheric air is substantially eliminated from within the plates and their cavities. A vacuum pressure is applied to an inside of vacuum mold 16 using at least one vacuum source 38 that is connected via vacuum lines. For example, the vacuum pressure or level on the system can be held between $1\times10^{-1}$ to $1\times10^{-4}$ Torr during the melting and subsequent molding cycle. In another embodiment, the vacuum level is maintained between $1\times10^{-2}$ to about $1\times10^{-4}$ Torr during the melting and molding process. Of course, other pressure levels or ranges may be used, such as $1\times10^{-9}$ Torr to about $1\times10^{-3}$ Torr, and/or $1\times10^{-3}$ Torr to about 0.1 Torr. An ejector mechanism (not shown) is configured to eject molded (amorphous alloy) material (or the molded part) from the mold cavity between the first and second plates of mold 16. The ejection mechanism is associated with or connected to an actuation mechanism (not shown) that is configured to be actuated in order to eject the molded material or part (e.g., after first and second parts and are moved horizontally and relatively away from each other, after vacuum pressure between at least the plates is released).

Any number or types of molds may be employed in the apparatus 10. For example, any number of plates may be provided between and/or adjacent the first and second plates to form the mold. Molds known as "A" series, "B" series, and/or "X" series molds, for example, may be implemented in injection molding system/apparatus 10.

In an injection molding apparatus 10 that is positioned inline and in a horizontal direction, to get the most power input into the meltable material, containing it in the melt zone 12, adjacent to induction coil 26, is effective for a consistent melt each cycle (e.g., rather than having molten material flow towards and/or out of the injection path of vessel 20). Accordingly, the likelihood of uniformly molded and formed parts depends upon the processes performed on the meltable material in the injection molding system 10. Uniform heating of the meltable material and maintenance of temperature of molten material in such an injection molding apparatus 10 assists in forming a uniform molded part. By improving the configuration of vessel 20 and melt zone 12, uniformity of molded parts can also be improved.

In accordance with this disclosure, to contain meltable material that is being melted and/or molten in such a system, at least one recess is provided in the vessel (or crucible or device used to hold the material during melting). A recess is defined as a cavity, depression, or indentation within a surface of the vessel for receiving and at least partially holding material in a molten form therein, and can also be referred to as a pocket or a slot throughout this disclosure. The recess is configured to contain molten material within a melt zone of the apparatus, and minimize heat loss (from the molten material). Additionally, the molten material has to be retained in the melt zone so that it does not mix too much or cool too quickly. The recess is provided in at least a bottom surface of each vessel, but can also extend into one or more sides of the body of the vessel. The recess is positioned within the melting portion adjacent melt zone 12 of the apparatus. By containing the melt in the vessel, a steady state temperature distribution while it (the material) is being melted is encouraged.

Figure 4:
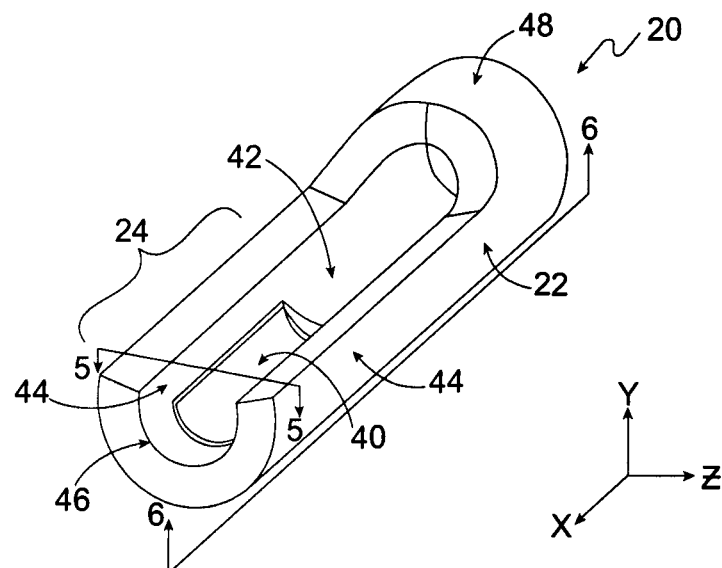
FIG. 4 illustrates a perspective view of a vessel with a recess in accordance with an embodiment of this disclosure.
Figure 5:
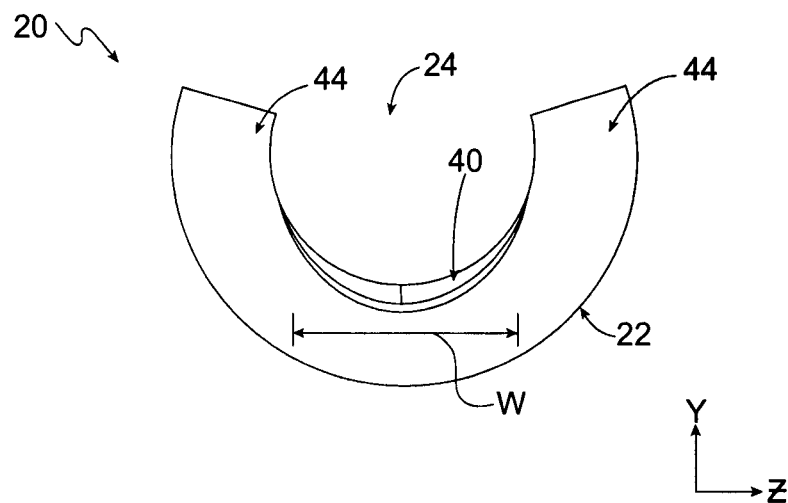
FIGS. 5-6 illustrates cross sectional views taken along section lines 5-5 and 6-6, respectively, of the vessel in FIG. 4.
Figure 6:
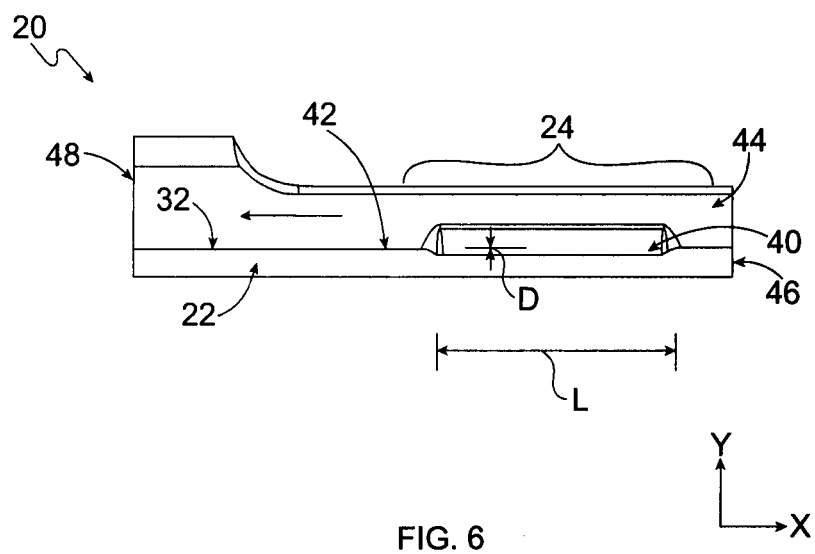

For example, FIGS. 4-6 illustrate views of a vessel 20 comprising a body 22 (or base) for meltable material to be melted therein with melting portion 24. Some features of vessel 20 are generally described above, and, therefore, not repeated here. Vessel 20 is a cold hearth melting device that is configured to be utilized for meltable material(s) while under a vacuum (e.g., applied by vacuum device 38). Body 22 comprises a first end 46 and a second end 48. Second end 48 includes injection path 32 of vessel 20 therein (e.g., see FIG. 6). As indicated by an arrow, after melting, molten material is configured for ejection from body 22 by moving through injection path 32 (towards a mold). Body 22 has melting portion 24 or area configured to receive meltable material to be melted therein (e.g., via a loading port, as shown in FIG. 3). For example, bottom surface 42 is provided in body 22 in melting portion 24 for receiving meltable material. Melting portion 24 can be provided adjacent or within first end 46 of body 22. Heating of meltable material is accomplished using an induction coil 26 positioned adjacent the body 22 substantially adjacent to a length of the melting portion 24 and/or body 22 of vessel 20. Accordingly, vessel 20 is configured to be used when inductively melting a material, such as a metal or alloy, within the melting portion 24 by supplying power to induction coil 26.

Body 22 is configured to be positioned in a horizontal direction. For example, vessel 20 may be configured to be used in an injection molding system that is positioned to melt and move material in a horizontal (and longitudinal) direction (e.g., along X-axis). In an embodiment, material is melted adjacent or in first end 46 and then ejected by pushing molten material through injection path 32 of second end 48.

In an embodiment, body 22 of vessel 20 comprises a substantially U-shaped structure (shown in cross section in FIG. 5). That is, the body has a base or bottom with surface 42 and side walls 44 extending therefrom. In an embodiment, vessel 20 may comprise substantially rounded and/or smooth surfaces. For example, surfaces 42 and side walls 44 of the melting portion 24 may be substantially formed in an arc shape. However, the shape and/or configuration of the surfaces of the body are not meant to be limiting.

As shown, body 22 of vessel 20 also includes a recess 40 in its melting portion 24 configured to contain the meltable material within the vessel 20 during melting of the material. Recess 40 is provided in bottom surface 42 of body 22. It can also extend into (e.g., partially) one or more sides 44 of the melting portion 24.

The size and dimensions of recess 40 are not meant to be limiting. In an embodiment, recess 40 comprises a width W and a depth D. For example, the width w may be the size of an opening in a lateral direction (e.g., perpendicular to a longitudinal direction of the vessel 20, e.g., perpendicular to the X-axis, as shown in FIG. 5, for example). Recess 40 may be provided at a depth D below a plane of the bottom surface 42 such that it extends into the body 22 (towards an external surface), shown in FIG. 6, for example. Recess 40 may also comprise a length L (e.g., relative to a longitudinal direction of the vessel 20). Its length extends at least a part of the length (from end to end) of body 22. In an embodiment, the dimensions of the recess 40 may change according to the amount of material to be melted.

In an embodiment, a coating of material may be applied within recess 40. The coating may be provided solely on and within the recess and/or on the surfaces 42 and 44 of the body 22. Techniques such as spray coating, laminating, shielding, dipping, thermal, flame, or plasma spraying, plating, chemical vapor deposition, physical vapor deposition processes and/or other thermal or chemical processes may be used to add such a coating material to vessel 20. A thickness of coating material as it is applied to one or more areas of the vessel 20 should not be limiting. Examples of coating materials may include, but are not limited to: ceramic, quartz, stainless steel, titanium, chrome, copper, silver, gold, diamond-like carbon, yttria, yttria oxide, and zirconia, and/or a combination thereof.

Accordingly, when implementing vessel 20 in a melt zone (e.g., of an injection molding system such as system 10), meltable material (e.g., as an ingot) is inserted and placed within recess 40 of vessel 20. As the material is melted, at least a portion of the meltable material in a molten state is contained in recess 40. In an embodiment, most or substantially all of the meltable material is contained within the recess 40. Once the melting process is complete, the molten material can be moved through an injection path 28 of vessel 20 (and towards/into a mold, such as mold 16).

In some instances, some molten material may be left behind and within recess 40 as the plunger moves through the opening of vessel 20 and through injection path 28. In some instances, the material that is retained in the recess 40 after molding may contain crystals or skull material, which is undesirable for molding. Such material may be removed after a molding process is finished, for example, and can be used later for re-melting and/or thrown away.

In an embodiment, after melting, the vessel 20 may be configured for movement (e.g., tilting or rotating) to allow molten material to freely flow from the recess or depression. For example, after the molten material has exited the recess, the plunger tip could follow behind and push the material through the injection path and into the mold.

Figure 7:
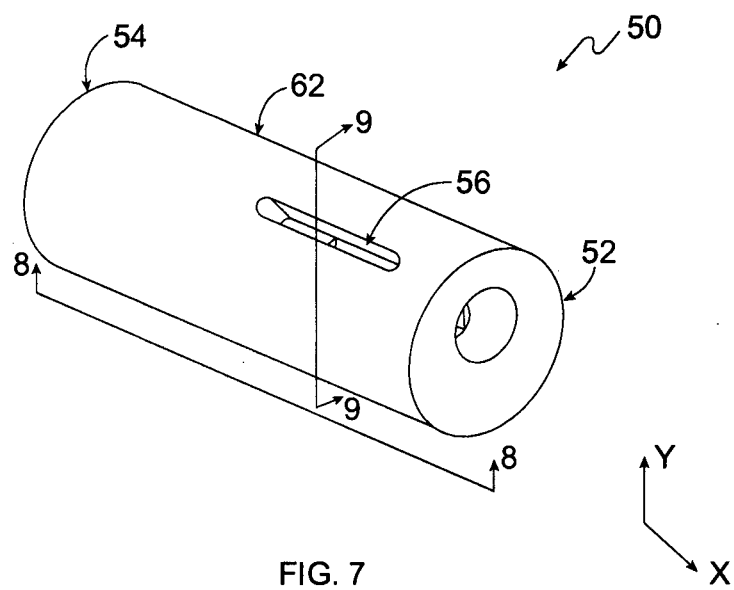
FIG. 7 illustrates a perspective view of a vessel with a recess in accordance with another embodiment of this disclosure.
Figure 8:
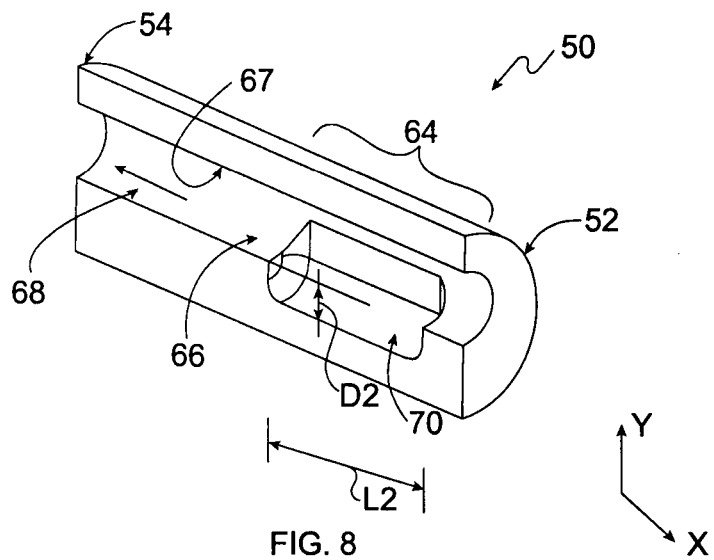
FIGS. 8 and 9 illustrate cross sectional views taken along section lines 8-8 and 9-9, respectively, of the vessel in FIG. 7.
Figure 9:
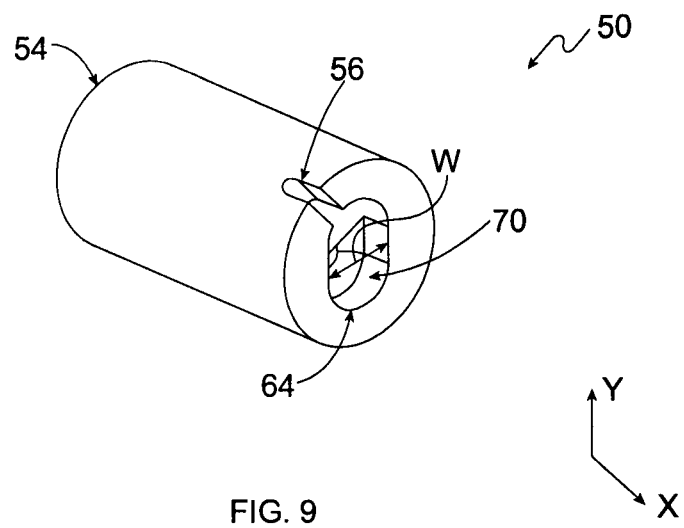

FIGS. 7-9 illustrates a vessel 50 in accordance with another embodiment wherein movement of the vessel is implemented after melting material therein. Vessel 50 comprises a body 62 (or base) for meltable material to be melted therein with melting portion 64. Features of vessel 50 may be similar to those described with reference to vessel 20 above, and, therefore, not repeated here. Vessel 50 is a cold hearth melting device that is configured to be utilized for meltable material(s) while under a vacuum (e.g., applied by vacuum device 38). Body 62 comprises a first end 52 and a second end 54. Second end 54 includes injection path 68 of vessel 50 therein (e.g., see FIG. 8). As indicated by an arrow, after melting, molten material is configured for ejection from body 62 by moving through injection path 68 (towards a mold). Body 62 has melting portion 64 or area configured to receive meltable material to be melted therein (e.g., via a loading port 18). For example, bottom surface 66 is provided in body 62 in melting portion 64 for receiving meltable material. Melting portion 64 can be provided adjacent or within first end 52 of body 62. Heating of meltable material is accomplished using an induction coil 26 positioned adjacent the body 62 substantially adjacent to a length of the melting portion 64 and/or body 62 of vessel 50. Accordingly, vessel 50 is configured to be used when inductively melting a material, such as a metal or alloy, within the melting portion 64 by supplying power to induction coil 26.

Body 62 is generally configured to be positioned horizontally in a longitudinal direction. For example, vessel 50 may be configured to be used in an injection molding system that is positioned to melt and move material in a horizontal (and longitudinal) direction (e.g., along X-axis). In an embodiment, material is melted adjacent or in first end 52 and then ejected by pushing molten material through injection path 68 of second end 54.

In one embodiment, body 62 may also comprise an opening 56 along a length of vessel 50. Opening 56 can allows for temperature measurements of meltable material during melting and/or IR measurements.

In an embodiment, body 62 of vessel 50 comprises a substantially tubular structure (also shown in cross section in FIG. 8). Body 62 has a base or bottom with surface 66 and side walls extending therefrom. Body also has a top receiving surface 67. In an embodiment, vessel 50 may comprise substantially rounded and/or smooth surfaces therein. For example, surfaces 66 and 67 and side walls of body 62 may be substantially formed in an arc, ovular, or circular shape. However, the shape and/or configuration of the surfaces of the body are not meant to be limiting.

As shown, body 62 of vessel 50 also includes a recess or pocket 70 in its melting portion 64 configured to contain the meltable material within the vessel 50 during melting of the material. Pocket 70 is provided in bottom surface 66 of body 62. It can also extend into one or more sides of the melting portion 64.

The size and dimensions of pocket 70 are not meant to be limiting. In an embodiment, recess comprise a width W (see FIG. 9) and a depth D2 (see FIG. 8). For example, the width W may be the size of an opening in a lateral direction (e.g., perpendicular to a longitudinal direction of the vessel 50, as shown in the cross sectional view of FIG. 9). Pocket 70 may be provided at a depth D2 below a plane of the bottom surface 66 such that it extends into the body 62 (towards an external surface). Pocket 70 may also comprise a length L2 (e.g., relative to a longitudinal direction of the vessel 20). Its length L2 extends at least a part of the length (from end 52 to end 54) of body 62. In an embodiment, the dimensions of the pocket 70 may change according to the amount of material to be melted.

In an embodiment, a coating of material may be applied within pocket 70. The coating may be provided solely on and within the pocket and/or on the surfaces 66 and 67 and side surfaces of the body 62. Techniques such as spray coating, laminating, shielding, dipping, thermal, flame, or plasma spraying, plating, chemical vapor deposition, physical vapor deposition processes and/or other thermal or chemical processes may be used to add such a coating material to vessel 50. A thickness of coating material as it is applied to one or more areas of the vessel 50 should not be limiting. Examples of coating materials may include, but are not limited to: ceramic, quartz, stainless steel, titanium, chrome, copper, silver, gold, diamond-like carbon, yttria, yttria oxide, and zirconia, and/or a combination thereof.

Furthermore, vessel 50 is configured for rotation about its longitudinal axis. That is, vessel 50 is a rotating vessel that is configured for movement between a first position and a second position. In the first position, vessel 50 is designed to restrict entry of material (e.g., in a molten state) into the injection path 68 of vessel 50 and to contain the material in the pocket 70 during melting. In the second position, vessel 50 is configured to allow movement of the molten material through injection path 68. In an embodiment, the vessel 50 is configured for positioning and rotation along a horizontal axis between the first position and the second position.

For example, as shown in FIGS. 7-9, vessel 50 is provided in a first (home, melting) position. In the first position, the material is melted (e.g., under vacuum and using the coil 26). After the melting process, vessel 50 is configured to rotate from the first position and into the second position, such that, during rotation of the vessel 50, molten material moves out from pocket 70, and at least along and onto side surfaces. In some embodiments, the molten material can move onto top surface 67. The molten material can then be moved through injection path 68 of vessel 50 by pushing a plunger through first end 52, through the body 62, towards second end 54. Molten material can be moved along a side surface and, in some cases top surface 67, through injection path 68, towards and into the mold.

The degrees in rotation of the vessel 50 from its first position to its second position should not be limiting. The second position of the vessel 50 can be any degree rotation in any direction (e.g., clockwise or counterclockwise) so as long as molten material is moved from pocket 70 for movement through injection path 68 of vessel 50.

The vessel 50 is configured to be associated with an actuation mechanism (not shown) and/or power source, so that the vessel 50 can be selectively moved and rotated between the first and second positions, and/or as needed. For example, rotating vessel 50 may be rotated as needed to its positions (first, melting position, and second, injection position) before loading of the material, or before the system begins, or after a part is molded.

Accordingly, when implementing vessel 50 in a melt zone (e.g., of an injection molding system such as system 10), meltable material (e.g., as an ingot) is inserted and placed within recess 70 of vessel 50 in its first position. As the material is melted, at least a portion of the meltable material in a molten state is contained in pocket 70. In an embodiment, most or substantially all of the meltable material is contained within the pocket 70. Once the melting process is complete, vessel 50 is rotated a desired number of degrees to its second position, so that the molten material can be moved from pocket 70 and onto side surfaces and/or top surface 67 for movement through injection path 68 of vessel 50 (and towards/into a mold).

Figure 12:
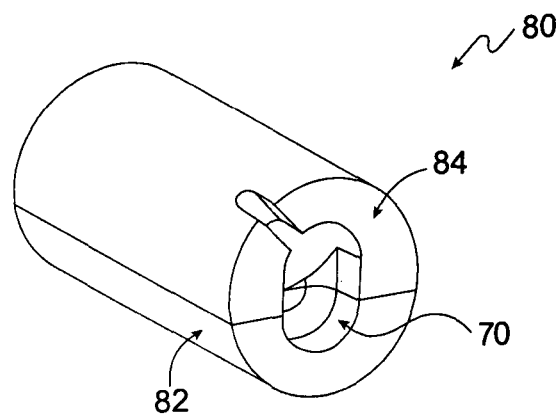
Figure 13:
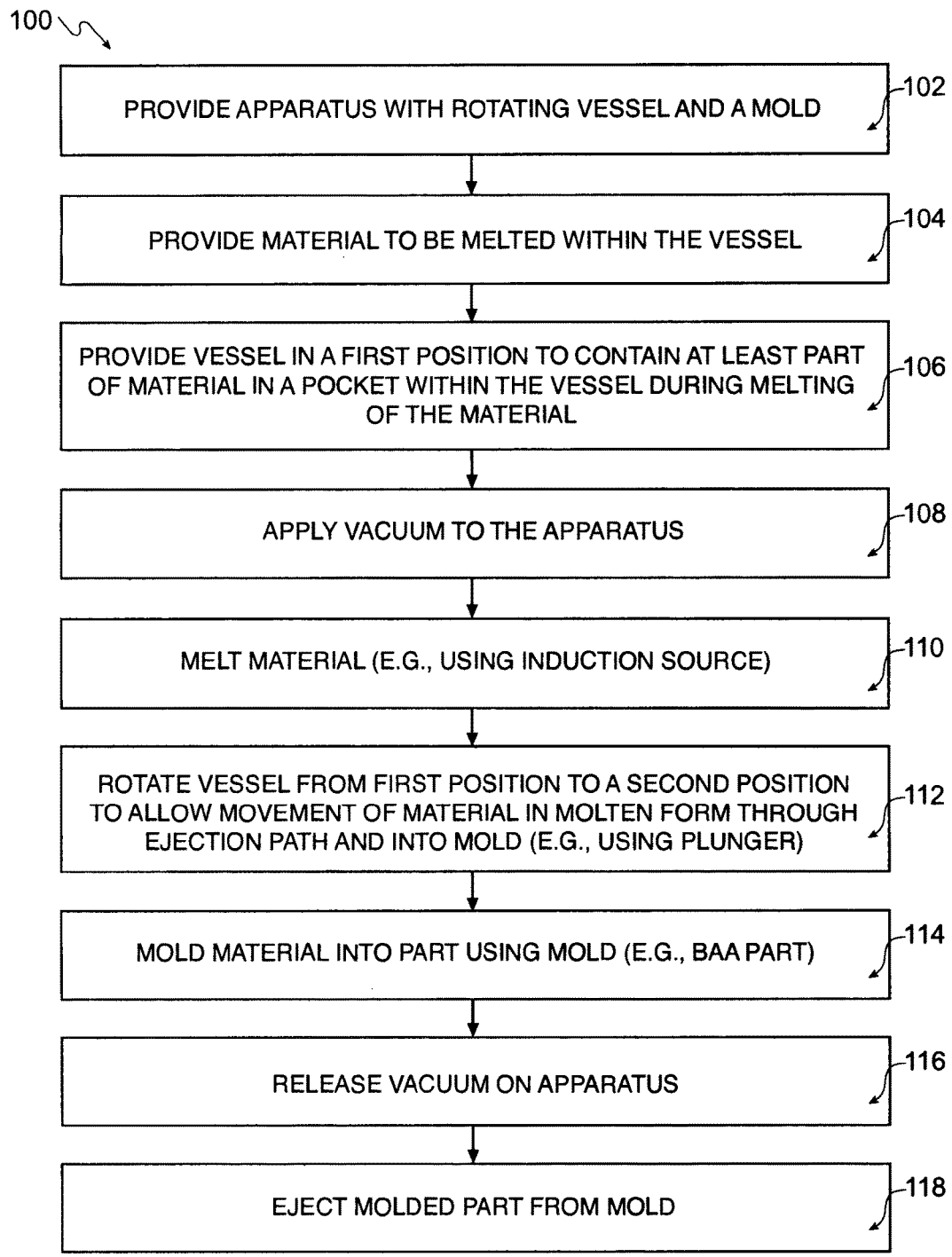
FIG. 13 illustrates a method for melting material and molding a part in accordance with an embodiment of the disclosure using a vessel as disclosed herein.

FIG. 13 illustrates a method 100 for melting material and molding a part in accordance with an embodiment of the disclosure using a vessel as disclosed herein, such as rotating vessel 50 or vessel 80, as shown and described with reference to FIGS. 7-9 and 10-12 (described below), respectively. The apparatus is designed to include rotating vessel 50 or vessel 80, and mold 16, as shown at 102. The rotating vessel is configured for movement between a first position and a second position, as previously described. Generally, the injection molding system/apparatus 10 may be operated in the following manner: Meltable material (e.g., amorphous alloy or BMG in the form of a single ingot 25) is loaded, inserted and received into the melt zone 12 into vessel 50 or 80 (surrounded by the induction coil 26), as shown at 104. At 106, rotating vessel 50 or 80 is provided in the first position to contain at least part of the material in pocket 70 within vessel 50 or 80 during melting of the material. Rotating vessel 50 or 80 may be rotated from another position (e.g., second, ejection position) and into first position before loading of the material, or may be provided in the first position before the method 100 begins (e.g., vessel may be rotated to first position after a molded part is ejected from the mold). The vacuum may be applied to the apparatus 10 before or after loading material to be melted, as shown at 108. The injection molding machine "nozzle" stroke or plunger 14 can be used to move the material, as needed, adjacent to or into pocket 70 of rotating vessel 50 (or vessel 80). The material is heated through the induction process at 110 (i.e., by supplying power via a power source to induction coil 26). The injection molding machine controls the temperature through a closed or opened loop system, which will stabilize the material at a specific temperature (e.g., using a temperature sensor and a controller). During heating/melting, a cooling system can be activated to flow a (cooling) liquid in any cooling line(s) of the vessel 50 or 80 (not shown) or apparatus (not shown). Once the desired temperature is achieved and maintained to melt the meltable material, the heating using induction coil 26 can be stopped. As shown at 112, rotating vessel is moved or rotated from the first position to the second position to allow movement of the material in a molten form through the injection path and into the mold. That is, the molten material is moved onto its surfaces such as side and/or top surfaces, so that the machine will then begin the injection of the molten material from vessel 20 by pushing through the molten material through injection path 68, through transfer sleeve 30 (if present), and into vacuum mold 16 by moving in a horizontal direction (from right to left) along the horizontal axis (X axis). This may be controlled using plunger 14, which can be activated using a servo-driven drive or a hydraulic drive. The mold 16 is configured to receive molten material through an inlet and configured to mold the molten material under vacuum, as shown at 114. That is, the molten material is injected into a cavity between the at least first and second plates to mold the part in the mold 16. As previously noted, in some embodiments, the material may be an amorphous alloy material that is used to mold a bulk amorphous alloy part. Once the mold cavity has begun to fill, vacuum pressure (via the vacuum lines and vacuum source 38) can be held at a given pressure to "pack" the molten material into the remaining void regions within the mold cavity and mold the material. After the molding process (e.g., approximately 10 to 15 seconds), the vacuum pressure applied to at least the mold 16 (if not the entire apparatus 10) is released, as shown at 116. Mold 16 is then opened to relieve pressure and to expose the part to the atmosphere. At 118, an ejector mechanism of the apparatus/mold (not shown) is actuated to eject the solidified, molded object from between the at least first and second plates of mold 16 via an actuation device. Thereafter, the process can begin again. Mold 16 can then be closed by moving at least the at least first and second plates relative to and towards each other such that the first and second plates are adjacent each other. The melt zone 12 and mold 16 is evacuated via the vacuum source once the plunger 14 has moved back into a load position, in order to insert and melt more material and mold another part. The rotating vessel can be moved back to its first position before melting of the next ingot of material begins.

Although materials such as coating materials may have been previously mentioned, it should be noted that the bodies of either vessel 20 or 50 may comprise one or more materials, including a combination of materials. The body of either vessel may be formed from any number of materials (e.g., copper, silver) and/or include one or more coatings. For example, the vessel bodies may comprise a metal or a combination of metals, such as one selected from the group of: stainless steel (SS), copper, copper beryllium, amcolloy, ceramic, sialon ceramic, yttria, zirconia, chrome, titanium, silver and stabilized ceramic coating. In embodiments, the bodies of vessels are formed from one or more materials that are RF insensitive. In an embodiment, vessel 20 and/or vessel 50 are formed from a single RF transparent material, such as ceramic. In an embodiment, the body 62 of the vessel 60 may be formed from a dielectric or insulator material that is non-conductive, such as a technical ceramic.

Figure 10:
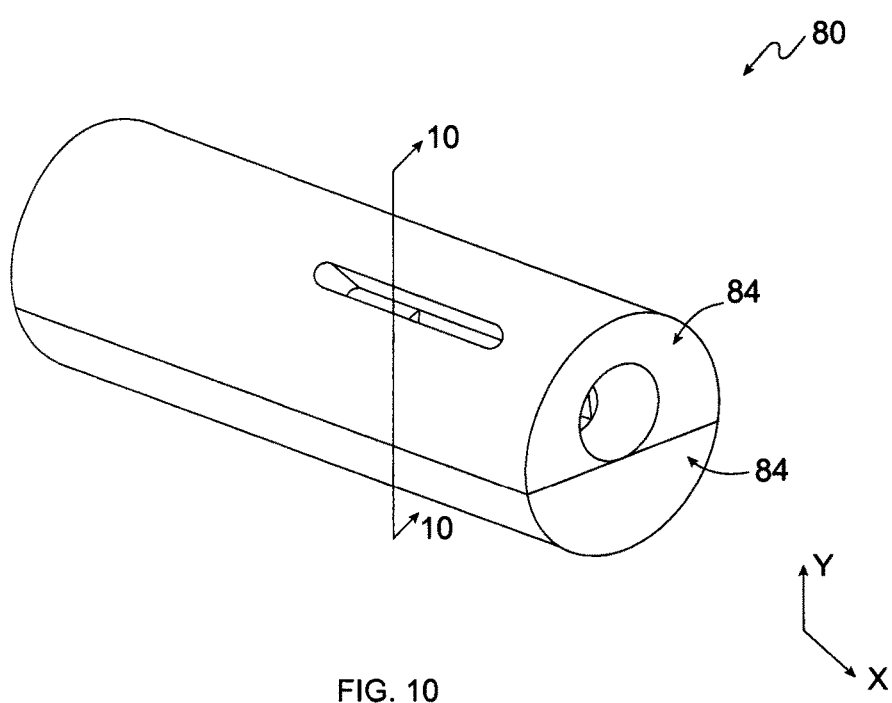
FIG. 10 illustrates a perspective view of a vessel with a recess in accordance with yet another embodiment of this disclosure.
Figure 11:
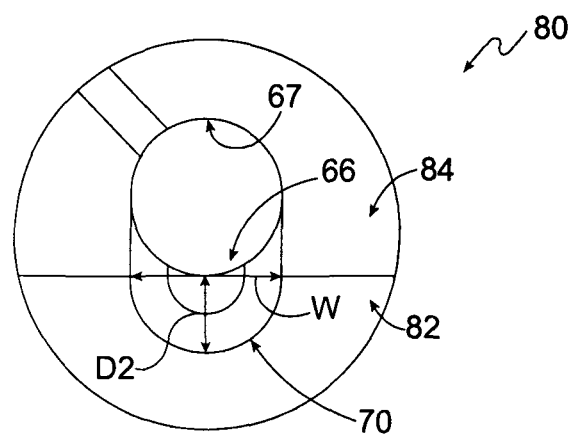
FIGS. 11 and 12 illustrate an end view and a perspective view, respectively, taken along a cross sectional line 10-10, of the vessel in FIG. 10.

FIGS. 10-12 illustrate a vessel 80 with similar features as vessel 50, shown in FIGS. 7-9. Accordingly, similar label indicators are shown to indicate its features such as: pocket 70, its depth D2, width W, and bottom and top surfaces 66 and 67 of the body, for example. Vessel 80 is configured for rotation in a similar manner as described for vessel 50 and is therefore not repeated here. Not all features are labeled. More specifically, however, FIGS. 10-12 show that vessel 80 is formed from two materials. For example, in an embodiment, vessel 80 is a composite boat formed with a bottom 82 of a first material and a top 84 of a second material that is different from the first material. The materials can be formed and connected together using techniques such as welding or bonding, for example, to form the vessel 80. The method(s) or technique(s) used to form vessel 80 of two materials is not limited. In an embodiment, the second material of the top 84 is an RF transparent material, while the first material of the bottom 82 is not. For example, the bottom 82 may be formed from a copper alloy while the top 84 is formed from ceramic. As such, it should be understood that the vessel used for melting materials can be formed from two or more materials that are mated together. Also, it should be understood that pocket 70 can also be formed from or coated with a material that is different from either or both bottom 82 and top 84.

In one embodiment, the material to be melted is an amorphous alloy. The injection molding system 10 may employ vessel 20, 50 or vessel 80 to melt an amorphous alloy and subsequently mold using mold 16 the molten amorphous alloy to form a molded bulk amorphous alloy part. The aforedescribed vessels can be used in a fabrication device and/or process including using BMG (or amorphous alloys). Because of the superior properties of BMG, BMG can be made into structural components in a variety of devices and parts. One such type of device is an electronic device, as noted previously.

Accordingly, the herein described implementations of vessels improves overall performance of the device, as well as improves the quality of the resultant molded product or part. The described embodiments of vessels are designed to improve melt and process temperatures for systems, as well as improve power consumption. Employing such implementations increases control of the temperature of the vessel and molten material. Accordingly, a higher energy efficiency may be achieved.

The above described embodiments of vessels may be used in any number of manufacturing methods or processes for melting material, such as amorphous alloy. By obtaining a vessel (as shown in any of the Figures), the method for melting can be implemented.

The herein disclosed embodiments also illustrate use of a vessel in an exemplary injection system that can be used in-line along a horizontal axis. The use of a recess in a vessel (or crucible) contributes to maintaining the meltable material during melting and in its molten state when provided in a horizontal fashion, and to induce steady state melting during melting process. It keeps the material adjacent to the induction zone formed by the induction coil during melting, which enables more uniform melting of the material, and which in turn can result in a more uniform molded part.

Although not described in great detail, the disclosed injection system may include additional parts including, but not limited to, one or more sensors, flow meters, etc. (e.g., to monitor temperature, cooling water flow, etc.), and/or one or more controllers. Also, seals can be provided with or adjacent any of number of the parts to assist during melting and formation of a part of the molten material when under vacuum pressure, by substantially limiting or eliminating substantial exposure or leakage of air. For example, the seals may be in the form of an O-ring. A seal is defined as a device that can be made of any material and that stops movement of material (such as air) between parts which it seals. The injection system may implement an automatic or semi-automatic process for inserting meltable material therein, applying a vacuum, heating, injecting, and molding the material to form a part.

The material to be molded (and/or melted) using any of the embodiments of the injection system as disclosed herein may include any number of materials and should not be limited. In one embodiment, the material to be molded is an amorphous alloy, as described in detail above.

The types of materials used for vessels in any of the illustrative embodiments herein is not meant to be limited. Furthermore, it should be noted that, although not illustrated, any of the herein described embodiments of vessels as shown in the FIGS. may be configured to be temperature controlled or cooled in some way.

In accordance with an embodiment, any of the vessels disclosed herein can be a temperature controlled vessel made of copper. In another embodiment, any of the vessels can be a temperature controlled vessel made of copper that is coated with a coating of another material, such as ceramic. In another embodiment, any of the vessels can be a temperature controlled vessel with at least its recess 40 or pocket 70 optionally being lined or coated with a material, such as ceramic. The coating material can be a different material that the material used to form the vessel, for example.

In another embodiment, any of the vessels can be a temperature controlled gate made of ceramic. In another embodiment, any of the vessels can be a temperature controlled gate made of ceramic that is coated with a coating of another material. In another embodiment, any of the vessels can be a temperature controlled gate with at least its recess 40 or pocket 70 lined or coated with a material. The coating material can be a different material that the material used to form the vessel, for example.

However, the vessels disclosed herein need not be temperature controlled. In yet another embodiment, any of the vessels are made of at least a ceramic. In another embodiment, any of the vessels are made of at least a ceramic that is coated with a coating of another material.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will be appreciated that many of the above-disclosed and other features and functions, or alternatives thereof, may be desirably combined into many other different systems/devices or applications. Various presently unforeseen or unanticipated alternatives, modifications, variations, or improvements therein may be subsequently made by those skilled in the art which are also intended to be encompassed by the following claims.

What is claimed is:

1. A vessel for containing a material during melting of the material, comprising:
    an inner wall defining:
    a melt zone comprising a recess set into a surface of the inner wall and extending around less than a complete circumference of the inner wall, the recess configured to contain the material in the recess during melting of the material; and
    an injection path adjacent the melt zone for guiding the material in a molten form out of the vessel.

2. The vessel according to claim 1, wherein:
    the inner wall is substantially tubular and extends along a longitudinal direction; and
    the recess has a length along the longitudinal direction less than a length of the inner wall along the longitudinal direction.

3. The vessel according to claim 2, wherein the recess has a width less than a circumference of the inner wall.

4. The vessel according to claim 1, wherein:
    the vessel is configured for movement between a first position and a second position;
    in the first position, the material is contained in the melt zone by the recess during melting of the material; and
    in the second position, the material is not contained in the recess, thereby allowing movement of the material in the molten form out of the melt zone and into the injection path.

5. The vessel according to claim 4, wherein:
    the vessel comprises a substantially tubular inner wall extending along an axis;
    the melt zone and the injection path are portions of the inner wall; and
    the vessel is configured to be rotated about the axis between the first position and the second position.

6. The vessel of claim 1, wherein the vessel comprises a substantially cylindrical body extending along a cylindrical axis.

7. An injection molding system comprising:
    a mold; and
    a vessel connected to the mold and comprising a substantially tubular inner wall, the substantially tubular inner wall defining:
    a first surface having a recess configured to receive material therein and substantially prevent egress of the material from the recess during melting of the material; and
    a second surface radially opposite the first surface and defining a substantially continuous surface for guiding the material out of the vessel and towards the mold after melting of the material.

8. The system according to claim 7, further comprising a plunger rod configured to move the material from the vessel and into the mold.

9. The system according to claim 8, wherein the plunger rod and vessel are positioned along a horizontal axis such that the plunger rod is moved in a horizontal direction through the vessel to move the material from the vessel and into the mold.

10. The system according to claim 8, wherein:
    when the vessel is in a first position, the material is contained in the recess; and
    when the vessel is rotated to a second position, the material is outside of the recess, thereby allowing movement of the material out of the vessel and into the mold.

11. The system according to claim 10, wherein:
    the substantially tubular inner wall is substantially cylindrical and extends along a cylindrical axis; and
    the vessel is positioned such that the cylindrical axis is substantially horizontal.

12. The system according to claim 8, further comprising a transfer sleeve joining the vessel to the mold.

13. The system according to claim 8, further comprising at least one vacuum source configured to apply vacuum pressure to at least the vessel and the mold.

14. The system according to claim 7, further comprising an induction source associated with the vessel to melt the material.

15. A method of melting a material, comprising:
placing a material to be melted within a vessel configured to move between a first position and a second position and comprising a recess configured to contain the material within the vessel during melting of the material;
applying a vacuum to the apparatus;
melting the material in the vessel, thereby forming a molten material; and
moving the vessel from a first position in which the material is contained in a recess in the surface of the vessel to a second position to allow movement of the molten material through an injection path and into a mold.

16. The method according to claim 15, wherein:
the apparatus further comprises a plunger; and
the method further comprises moving a plunger through the vessel to move the molten material through the injection path after the vessel is positioned in the second position.

17. The method according to claim 15, wherein the operation of moving the vessel from the first position to the second position comprises rotating the vessel about an axis.

18. The method according to claim 15, wherein:
the apparatus further comprises an induction source positioned adjacent the vessel; and
the operation of melting the material comprises powering the induction source.

19. The method according to claim 15, wherein the material is an amorphous alloy.

20. A method of making a bulk amorphous alloy part comprising:
placing an alloy material to be melted within a recess in an inner wall of a vessel;
melting the alloy material in the vessel, thereby forming a molten material;
moving the vessel from a first position to a second position to pour the molten material out of the recess and onto the inner wall;
moving the molten alloy material through an injection path and into a mold; and
molding the molten material into the bulk amorphous alloy part.

21. The method according to claim 20, further comprising:
releasing the vacuum on the apparatus; and
ejecting the bulk amorphous alloy part from the mold.

* * * * *